Aug. 5, 1969     J. F. SCHULZ ET AL     3,458,936

DENTAL MODEL WITH TEETH-RETAINER PINS

Filed June 21, 1967

INVENTORS.
JOHN F. SHULZ
JOSEPH J. TUCCILLO
BY
ATTORNEY

United States Patent Office 3,458,936
Patented Aug. 5, 1969

3,458,936
DENTAL MODEL WITH TEETH-RETAINER PINS
John F. Schulz, Locust Valley, N.Y., and Joseph J. Tuccillo, Norwalk, Conn., assignors to J. F. Jelenko & Co., Inc., New Rochelle, N.Y., a corporation of New York
Filed June 21, 1967, Ser. No. 647,810
Int. Cl. A61c 13/10; G09b 23/28
U.S. Cl. 32—71
5 Claims

ABSTRACT OF THE DISCLOSURE

The dental model and artificial teeth of the present invention comprises an articulation or other anatomical simulating form or mounting means for the teeth, with the provision of improved interengaging means on the form and on the teeth for the automatic releasable securement of the teeth in position on the form in response to the positioning of the teeth in their positions on the form.

Background of the invention

This invention relates to dental models with artificial teeth.

The invention is in the field of dentistry, especially in the teaching of dentistry and for demonstration purposes by the use of replicas of teeth in mouth models.

Dental models in which artificial teeth are releasably secured by separate fastening such as screws, for example, are known. Self-retaining means on teeth models are also known as shown, for example by one or more of United States Patents 1,045,920 to Wenker, 1,387,540 to Hawksworth et al., 2,266,434 to Morrison, and 3,226,827 to Spalten. Devices such as those disclosed in these patents eliminate the need for separate fastening means such as screws for securing the teeth in the model or form.

Summary of the invention

The primary object of the present invention is to improve upon devices of the type shown by the abovementioned and for that purpose to provide a model and teeth which have one or more of the following features, namely: (1) self-retaining releasable securement of the root parts of the teeth inwardly of the gum line of the model and with means on said parts to provide proper bite position of the teeth, (2) molding of metal toothsecurement means into the tooth bodies which are formed of a suitable plastic, (3) the securement and the companion engagement means on the form having parts which are non-circular in cross-section for proper alignment of the teeth on the forms, and (4) a simple provision for the easy removal of one or more teeth from the model and the easy placement of the teeth on the model. These and other features which might hereinafter appear are not necessarily of the order of importance in which they are set forth.

Brief description of the drawing

In the drawing which illustrates the presently preferred embodiment of the invention, but not the only possible embodiment.

Description of the preferred embodiment

Figure 1:
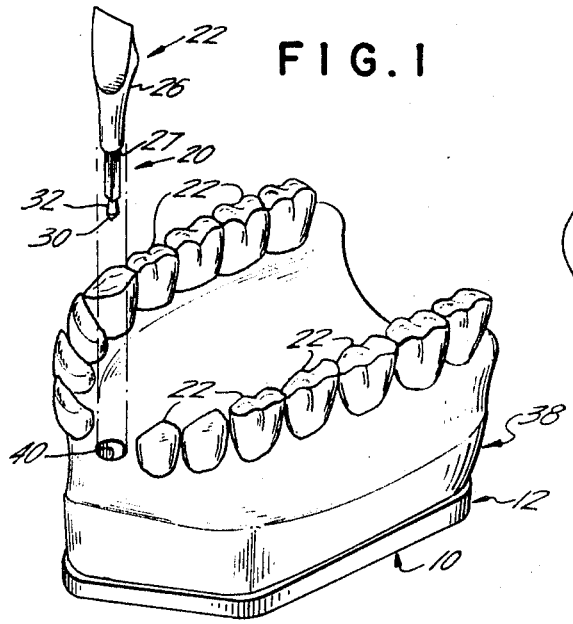
FIGURE 1 is a perspective view of a model and teeth according to the invention, showing one tooth removed from the model but in a related position thereto.
Figure 2:
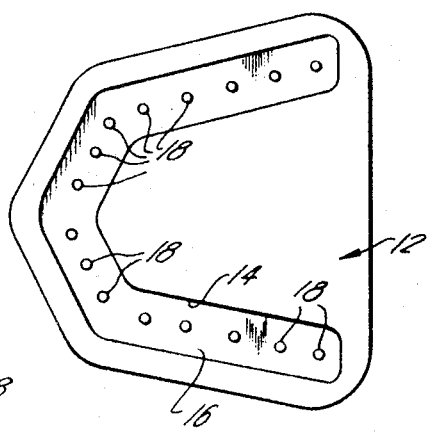
FIGURE 2 is a plan view of the model opposite the side at which the teeth are disposed in view.
Figure 3:
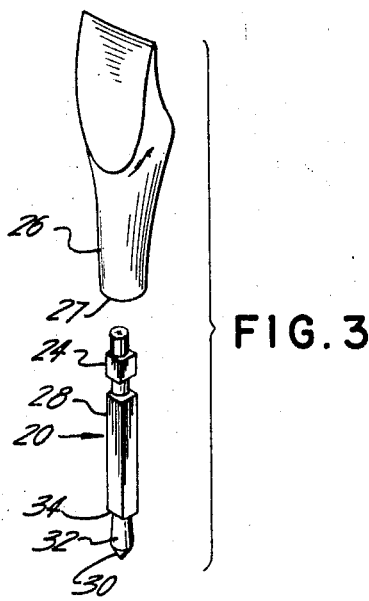
FIGURE 3 is an exploded perspective view of a tooth body and its companion securing pin.

The simulated anatomical form 10 is preferably adapted to be mounted on a dental articulation (not shown). It comprises a molded hard base 12 of a phenolic resin, of simulated jaw form and provided with a groove 14 in its side remote from the teeth mounting side. A layer 16 of polypropylene or other suitable yieldable material is disposed in said groove and is provided with a plurality of holes 18 in lateral spaced relation and in registry with a companion hole 19 of a series of lateral holes in base 12 each adapted to receive a tooth holding steel pin 20 of a tooth 22.

Figure 4:
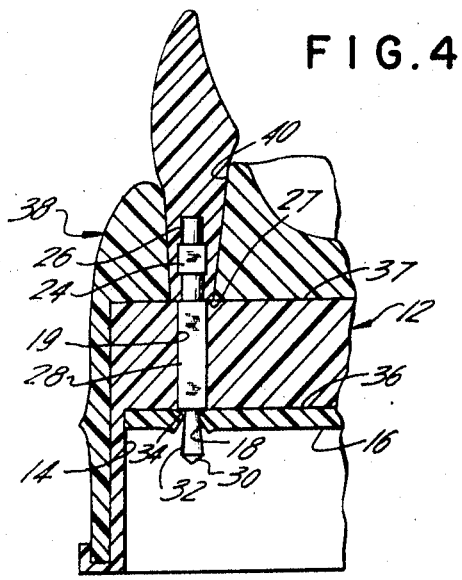
FIGURE 4 is a fragmentary vertical sectional view of the model and a tooth mounted in position.

Pins 20 are molded into the companion teeth, respectively, as illustrated by FIGURE 4; pins 20 each have a non-circular portion 24 which is disposed within the root portion 26 of the tooth and a longitudinally extending shank which is square or otherwise non-circular in cross section which has a sliding fit in hole 19. The inner end portion of each pin 20 has a tapering extreme end 30 and an outwardly flaring end part 32, providing a peripheral shoulder 34. The shoulders 34 are seated on the inner flat surface 36 of base layer 16. The flat inner end 27 of the teeth root parts 26 abut the flat surface 37 of base 12. The gums simulated part 38 which may be formed of suitable simulated gum tissue material, many of which are well known to persons in the field of dentistry and mechanical dentistry, have the root parts therein. Inwardly tapering recesses 40 are provided in said part 38, each in registry with a hole 19 in base 12, and the root parts 26 are each tapered and have a snug fit in a companion recess 40.

From the above description it is apparent that each tooth is securely but releasably mounted in the model 10. When mounting a tooth on the form its pin 20 is inserted through a recess 40 and is positioned in registering holes 18 and 19 in base 12. The extreme tapered end 30 of the pin facilitates its insertion through hole 18 to a position in which peripheral shoulder 27 abuts surface 37. The outwardly flaring end part 32 adjacent end 30 releasably opposes removal of the tooth from the model. To remove a tooth from the model it is convenient to press a pin or other slender member endwise against the end 30 in a direction longitudinally of pin 20 to force flaring end 32 out of the hole 18 in resilient pin-holding layer 16.

What is claimed is:

1. A dental model comprising a base simulating a jaw, said base having holes for receiving the root parts of artificial teeth, a tooth fastening member secured to each root part and projecting from the outer end of said root part and through said holes, resilient means carried by said base on the side thereof nearer to root parts of the teeth than to the exposed parts of the teeth and provided wtih holes in registry with said first-mentioned holes, respectively, and end means on the outer ends of said pins projecting into said holes in said resilient means to positions in which said end means on said pins are releasably secured in position on said base by the interengagement of said end means with said resilient means, each of said end means having an outwardly flaring end part releasably opposing removal of the corresponding tooth from the model and forming a peripheral shoulder at the end of the corresponding pin, wherein said pins have axially extending portions which are non-circular in cross section, said axially extending portions of said pins having a sliding fit in said first mentioned holes, respectively.

2. A dental model according to claim 1, wherein the root parts have flat outer ends and the base has a flat surface against which said ends abut for determining the positions of the teeth on said base.

3. A dental model according to claim 1, wherein gum simulation material is carried by said base and has recesses in which said root parts are received and thereby concealed, said recesses being in registry with said holes in the base.

4. A dental model according to claim 3, wherein said recesses taper toward the part of said base which is provided with the holes and wherever the teeth root parts have a corresponding taper.

5. A dental model according to claim 1, wherein the means on the outer ends of the pins each has a portion which tapers toward the outer end of the pin and an adjacent portion which has an opposite taper, each of said pins having a shoulder at the inner of said opposite taper in abutting relation with said resilient means around said opening therein.

References Cited
UNITED STATES PATENTS

| | | | |
|---|---|---|---|
| 1,387,540 | 8/1921 | Hawksworth et al. | 32—71 |
| 1,711,947 | 5/1929 | Ingwersen | 32—71 |
| 1,822,043 | 9/1931 | Kohler | 32—71 |
| 1,948,059 | 2/1934 | Baugh | 32—71 |
| 3,226,827 | 1/1966 | Spalten | 32—71 |

ROBERT PESHOCK, Primary Examiner